United States Patent [19]

Loggins

[11] Patent Number: 5,002,340
[45] Date of Patent: Mar. 26, 1991

[54] BED CLEANER FOR DUMP TRUCKS

[76] Inventor: Walter L. Loggins, Rte. 1, Box 233L, Remlap, Ala. 35133

[21] Appl. No.: 455,235

[22] Filed: Dec. 22, 1989

[51] Int. Cl.$^5$ ................................................ B60P 1/00
[52] U.S. Cl. .................................... 298/1 V; 414/515; 414/513; 298/1 B
[58] Field of Search ............... 414/509, 512, 513, 514, 414/515, 519, 521, 525.1, 525.2, 525.3, 525.6, 491, 492, 494; 198/738, 741; 298/1 B, 1 V, 1 R

[56] References Cited

U.S. PATENT DOCUMENTS

| | | | |
|---|---|---|---|
| 1,485,632 | 3/1924 | Shea | 298/1 B |
| 2,463,987 | 3/1949 | Malone et al. | 298/1 B |
| 2,909,295 | 10/1959 | Weir | 414/515 |
| 3,164,410 | 1/1965 | Robinson et al. | 414/515 X |
| 3,198,355 | 8/1965 | Kamin | 414/513 |
| 4,578,015 | 3/1986 | Baldarelli et al. | 414/513 |
| 4,685,856 | 8/1987 | Hesse | 414/515 |

Primary Examiner—David A. Bucci
Assistant Examiner—Brian K. Dinicola
Attorney, Agent, or Firm—Jennings, Carter, Thompson & Veal

[57] ABSTRACT

A bed cleaner for dump trucks utilizing a scraping carriage located in the bed of a dump truck and operated by cables connected to a winch assembly to dislodge and remove adhering materials from the dump bed while the dump bed is in an inclined position. The apparatus includes a device for remotely or automatically controlling the movement of the sliding carriage on the dump bed.

29 Claims, 6 Drawing Sheets

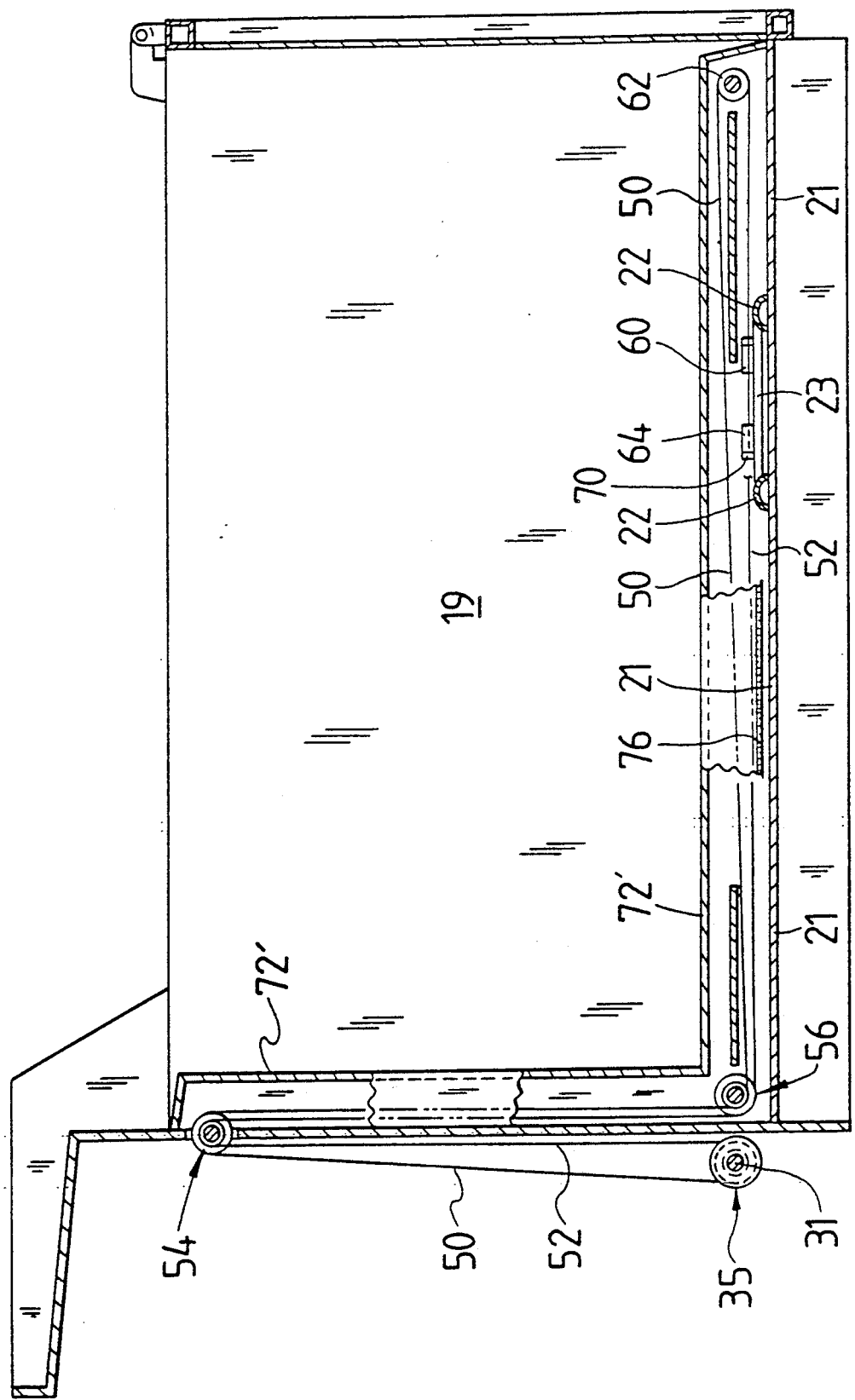

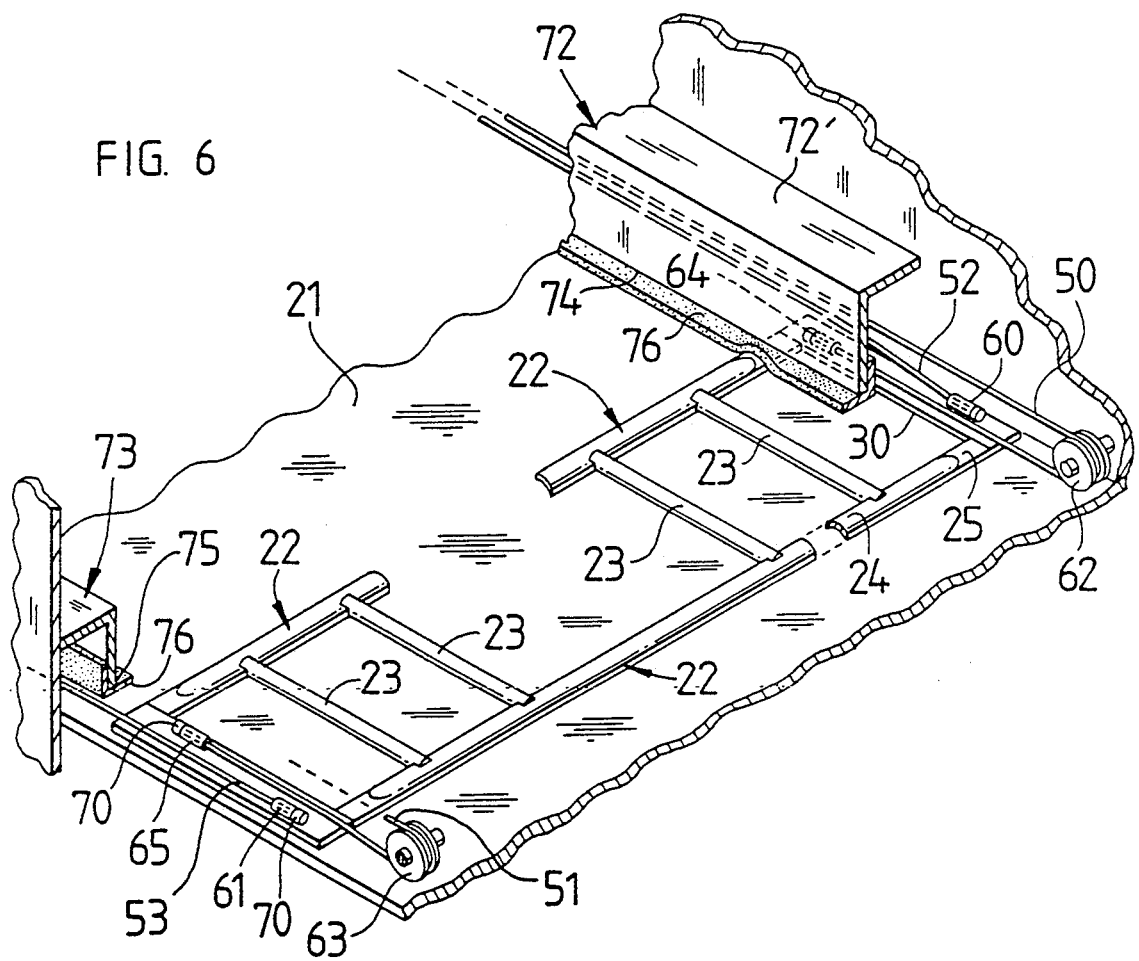
FIG. 6
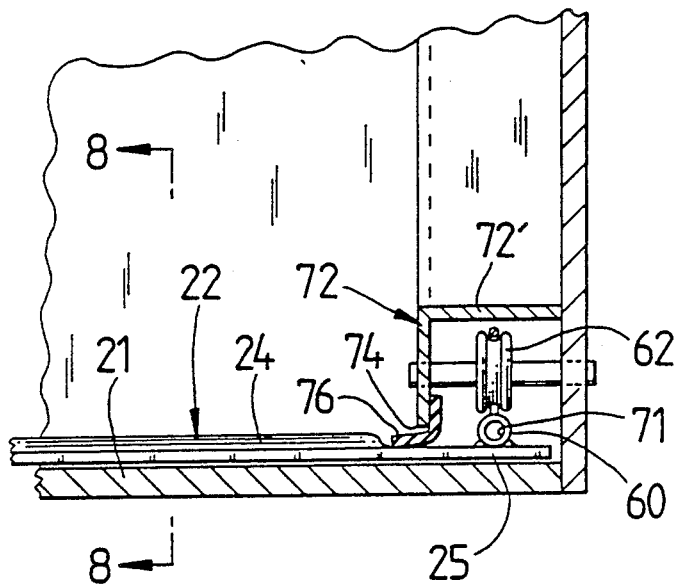
FIG. 7
FIG. 8

5,002,340

BED CLEANER FOR DUMP TRUCKS

FIELD OF INVENTION

The present invention relates to dump truck dump bodies and more particularly to apparatus for selectively cleaning the dump bed of such dump bodies. In greater particularity the present invention relates to scraping apparatus utilized to remove adhering load materials which remain in the dump body when such dump body is in an inclined position.

BACKGROUND OF THE INVENTION

The use of dump bodies affixed to a truck frame is well known in the trucking industry. When existing bodies are used to haul moist or compactible materials the efficiency of these dump bodies is somewhat limited. As existing dump bodies are raised, a large percentage of the moist or compactible load material is gravitationally discharged from the rear of these dump bodies. However, due to the clinging nature of some load material, there is a percentage of residual material that adheres to the bed of the dump body.

In order to remove the adhering material, workmen must climb into the dump body and manually remove the material. A substantial amount of work hours are wasted in an effort to clean the dump bed in this manner.

SUMMARY OF THE INVENTION

It is the principal object of the present invention to provide an apparatus that is capable of selectively removing adhering material from a dump bed.

Still another object of the invention is to provide an apparatus for cleaning a dump bed that is operable from a remote position.

Still another object is to provide a system which can be readily adjusted to vary the degree of forward and rearward movement of the apparatus within the dump body.

Still another object of the present invention is to provide an apparatus for removing adhering load material from a front wall of the dump body.

These and other objects and advantages of our invention are accomplished through the use of a scraping carriage located within the dump body which is urged along the dump body by an assembly of cables and pulleys. These cables are propelled by a reversible winch which can be automatically operated under the regulation of a series of limit switches and a control circuit. The cables are connected to a rotatable drive shaft which is itself operatively connected to the reversible winch. The cables extend into the dump body but ar isolated from load material located within the dump body by a pair of cable housings.

When the winch is activated in a forward direction the cables are pulled toward the front of the dump body. The scraping carriage being secured to these cables is also pulled forward. Scrapers located on the scraping carriage dislodge adhering material from the dump bed as the carriage moves forward. Upon activating a forward limit switch the apparatus stops and may be operated in the reverse direction. The scrapers are adapted to scrape in either direction and upon reversal of the apparatus continue to dislodge adhering material allowing such material to be removed from the dump body. A rearward limit switch operates in a similar manner to the forward limit switch and restricts the rearward movement of the carriage at a predetermined distance from the tailgate of the dump body. The movement of the scraping carriage within the dump body is restricted by the limit switches but can be operated within these parameters by a remote control circuit.

The apparatus also includes two bar members suspended by a plurality of chains on the inner side of the forward wall of the dump body. As the dump body is tilted to dump its load the bars and chains are gravitationally pulled away from the front wall thereby disengaging residual load material that tends to adhere thereon.

BRIEF DESCRIPTION OF THE DRAWINGS

Apparatus embodying features of the present invention are illustrated in the accompanying drawings which form a portion of this disclosure and wherein:

FIG. 3 is a sectional side view taken along lines 3—3 of FIG. 2;

FIG. 6 is a detailed perspective view of a section of dump body including a scraping carriage;

FIG. 7 is a detailed sectional view taken along line 7—7 of FIG. 6;

FIG. 8 is a detailed sectional view taken along line 8—8 of FIG. 7;

DESCRIPTION OF PREFERRED EMBODIMENT

Figure 1:
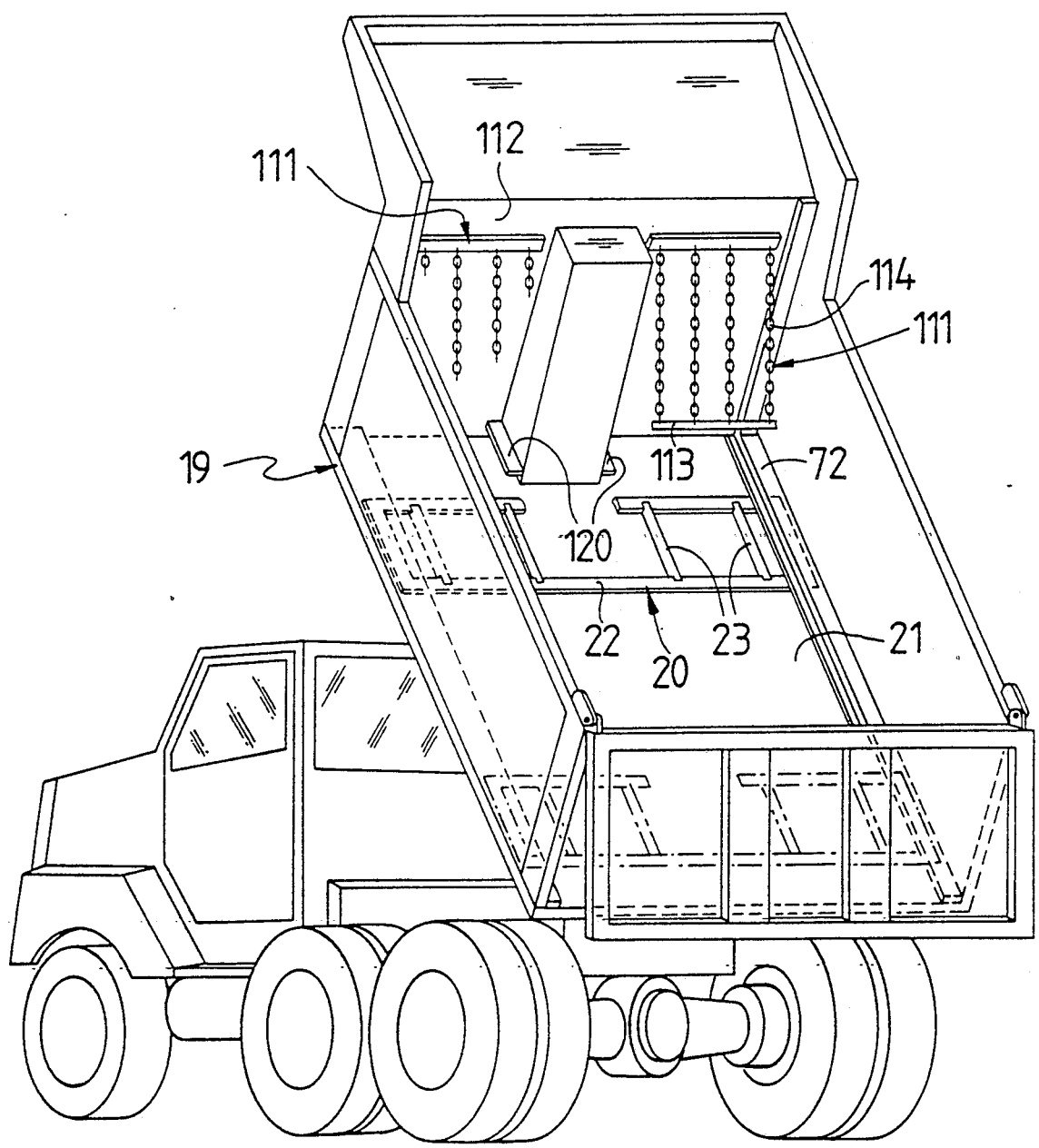
FIG. 1 is a perspective view of a dump truck equipped with the present invention.

Referring to the drawings for a clearer understanding of the invention, the preferred embodiment comprises apparatus for scraping the dump bed 21 of the dump body 19 including a scraping carriage 20 laterally extending across the dump bed 21 which further includes three scrapers 22 which partially define the lateral extension of such scraping carriage 20. Such scrapers 22 are separated by a plurality of perpendicularly extending gussets 23 extending perpendicular to such scrapers 22 and are defined by a cross-sectionally curved beam portion 24 as shown in FIG. 6, such beam portion 24 being connected on both ends to plate portions 25 which further defines the scrapers 22. The anticline of such curved beam portion 24 extends upward thereby positioning the marginal edges of such curved portions 24 angularly adjacent the dump bed 21. Two end beams 30 extend parallel to the gussets 23 and are located on the lateral extensions of the plate portions 25, extending transversely thereof.

Figure 2:
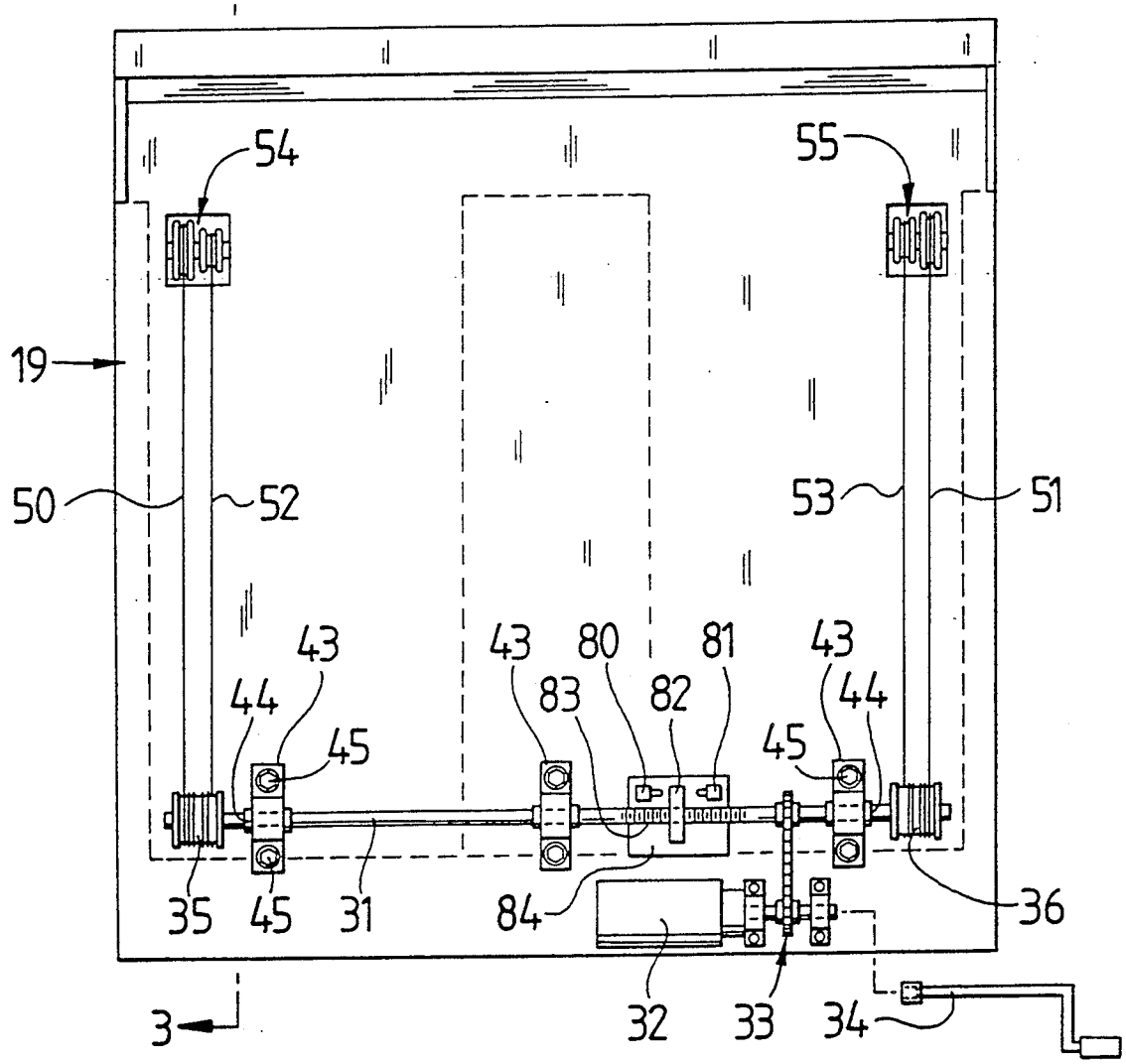
FIG. 2 is a front elevational view of a dump body equipped with the present invention.
Figure 9:
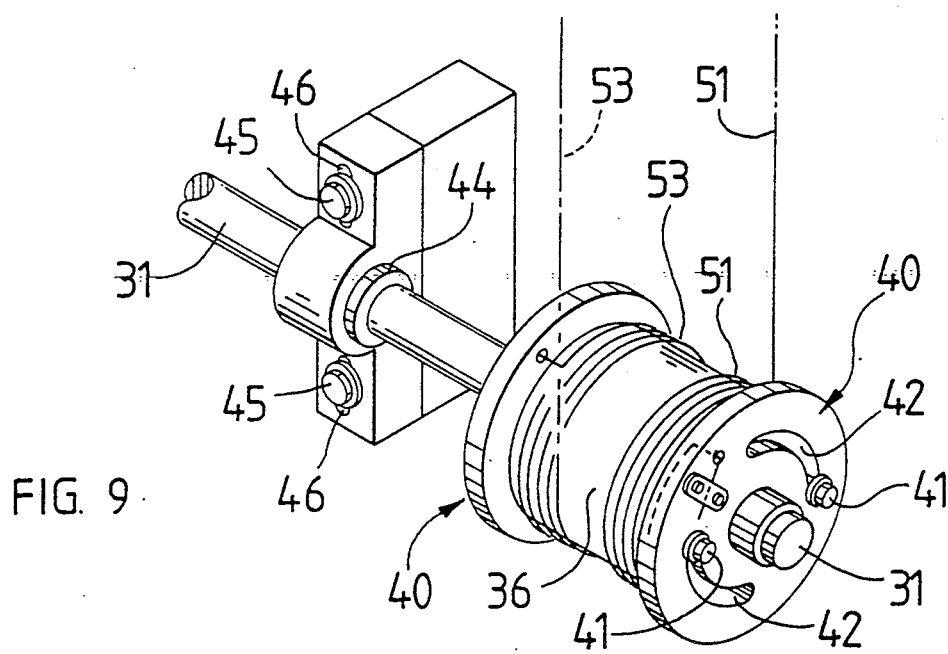
FIG. 9 is a detailed perspective view of a drum and shaft portion of the present invention.
Figure 11:
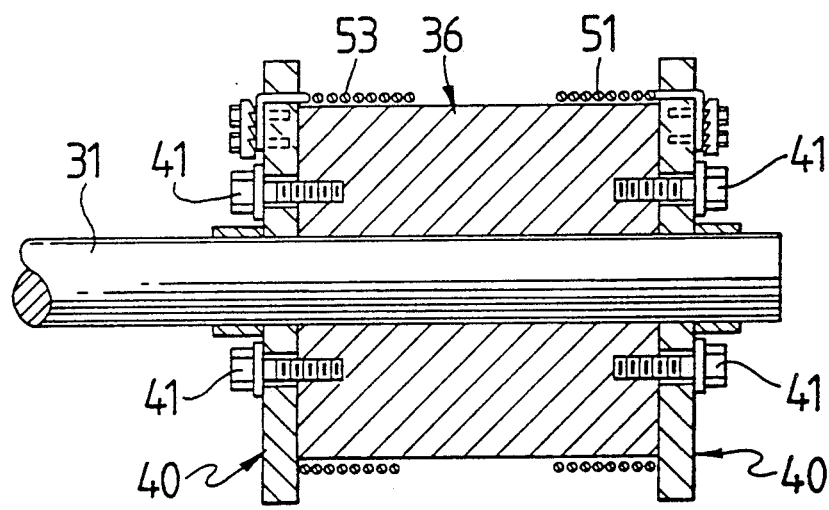
FIG. 11 is a sectional view taken along line 11—11 of FIG. 10.
Figure 10:
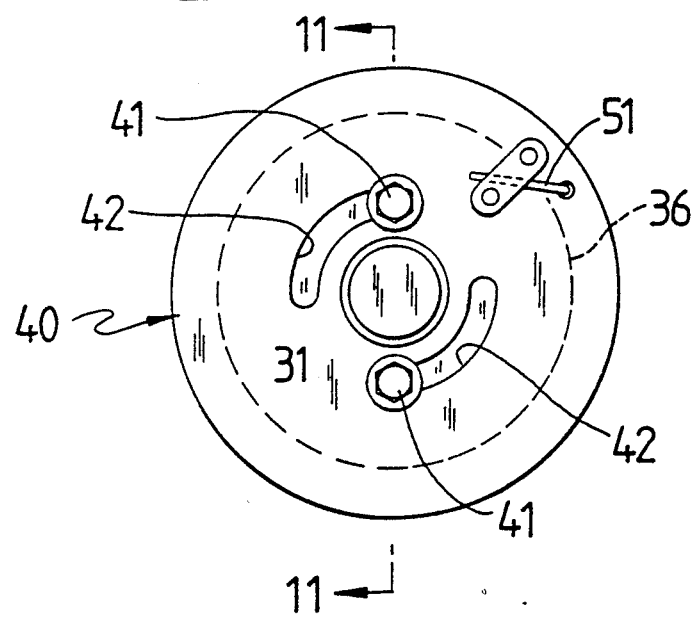
FIG. 10 is a end elevational view of the drum portion shown in FIG. 9.

The scraping carriage 20 is urged longitudinally along the dump bed 21 by a rotatable drive shaft 31 mounted transversely across the front of the dump body 19, shown in FIGS. 2 and 3, wherein said drive shaft 31 is selectively rotated by an electric winch assembly 32 operatively connected to said drive shaft 31 by a chain and sprocket assembly 33. The drive shaft 31 can be selectively rotated by a manual crank 34 which is removably attachable to the electric winch assembly 32. A pair of winding drums 35 and 36 are axially secured to the extended ends of the drive shaft 31 and rotate in conjunction with the rotation of the drive shaft 31. Each winding drum 35 and 36 is mounted to the drive shaft 31 by a pair of adjusting plates 40 shown in FIGS. 10 and 11, each plate 40 being annularly secured to and radially extending from the drive shaft 31. Each end of the winding drums 35 and 36 is adjustably secured to the adjusting plate 40 by two securing bolts 41 extending through a pair of rotation slots 42 which are defined within each adjusting plate 40. The drive shaft 31 is rotatably mounted to the front of the dump body by three pillow blocks 43, through which said drive shaft 31 extends and is secured therein by bearings 44 as shown in FIG. 9. The pillow blocks 43 and the electric winch assembly 32 are slidably attached to the front of the dump body 19 by adjusting bolts 45 which extend through adjusting slots 46 defined within the pillow blocks 43 and the electric winch assembly 32. A pair of forward cables 52 and 53 and a pair of reverse cables 50 and 51 are attached to and wrapped several rotations around the winding drums 35 and 36 with one forward and one reverse cable on each drum as shown in FIG. 9. The reverse cables 50 and 51 are wrapped rotationally opposite the forward cable 52 and 53 but all cables extend upward and over a first pair of double pulleys 54 and 55 located at the top corners of the dump body 19, as viewed in FIGS. 2 and 3. The cables extend downward from said first pair of double pulleys 54 and 55 and under a second pair of double pulleys 56 and 57 as viewed in FIG. 3. The forward cables 52 and 53 extend longitudinally along the dump bed 21 adjacent the sides of the dump body 19 and are mounted to a rearward portion of the scraping carriage end beams 30 by a pair of first tubular joiners 60 and 61. The reverse cables 50 and 51 extend longitudinally along the dump body 19 coextensively with the forward cables 52 and 53 but continue to extend to and around a pair of single pulleys 62 and 63 located at the rear corners of the dump body 19. The reverse cables 50 and 51 continue to extend forward along the dump body 19 and are mounted to a forward portion of the scraping carriage end beams 30 by a pair of second tubular joiners 64 and 65. The cables are secured to their respective tubular joiners by being extended through a cross-sectionally circular channel 71 located within such tubular joiners, being held in tension against such joiners 64 and 65 by swedges 70 which are attached to the extended portion of such cables. The portions of the aforementioned cables and pulleys which are located within the dump body are enclosed within a pair of cable housings 72 and 73 shown in FIGS. 6 and 7 which are partially defined by cross-sectionally L-shaped cable covers 72' and 73' which co-extend the length of the dump body 19 from the single pulleys 62 and 63 to the first double pulleys 54 and 55 running parallel to the aforementioned cables. These cables are encompassed between the cable covers 72' and 73' and the side walls of the dump body 19. The cable housing 72 and 73 are further defined by a pair of scraping slots 74 and 75 found within said cable covers 72' and 73' located adjacent to said dump bed 21 through which the scraping carriage 20 extends and is longitudinally movable. The cable housings 72 and 73 are each defined by a strip of protective belting 76 connected to the cable covers 72' and 73' and extending across the scraping slots 74 and 75. As the carriage 20 moves along the dump bed, the protective belting 76 flexes to allow passage of the carriage 20. Once the carriage 20 passes, the protective belting 76 returns to its original position covering the scraping slots 74 and 75. The protective belting 76 aids in isolating the cables and pulleys located within the cable housings 72 and 73 from load material being transported within the dump body.

Figure 12:
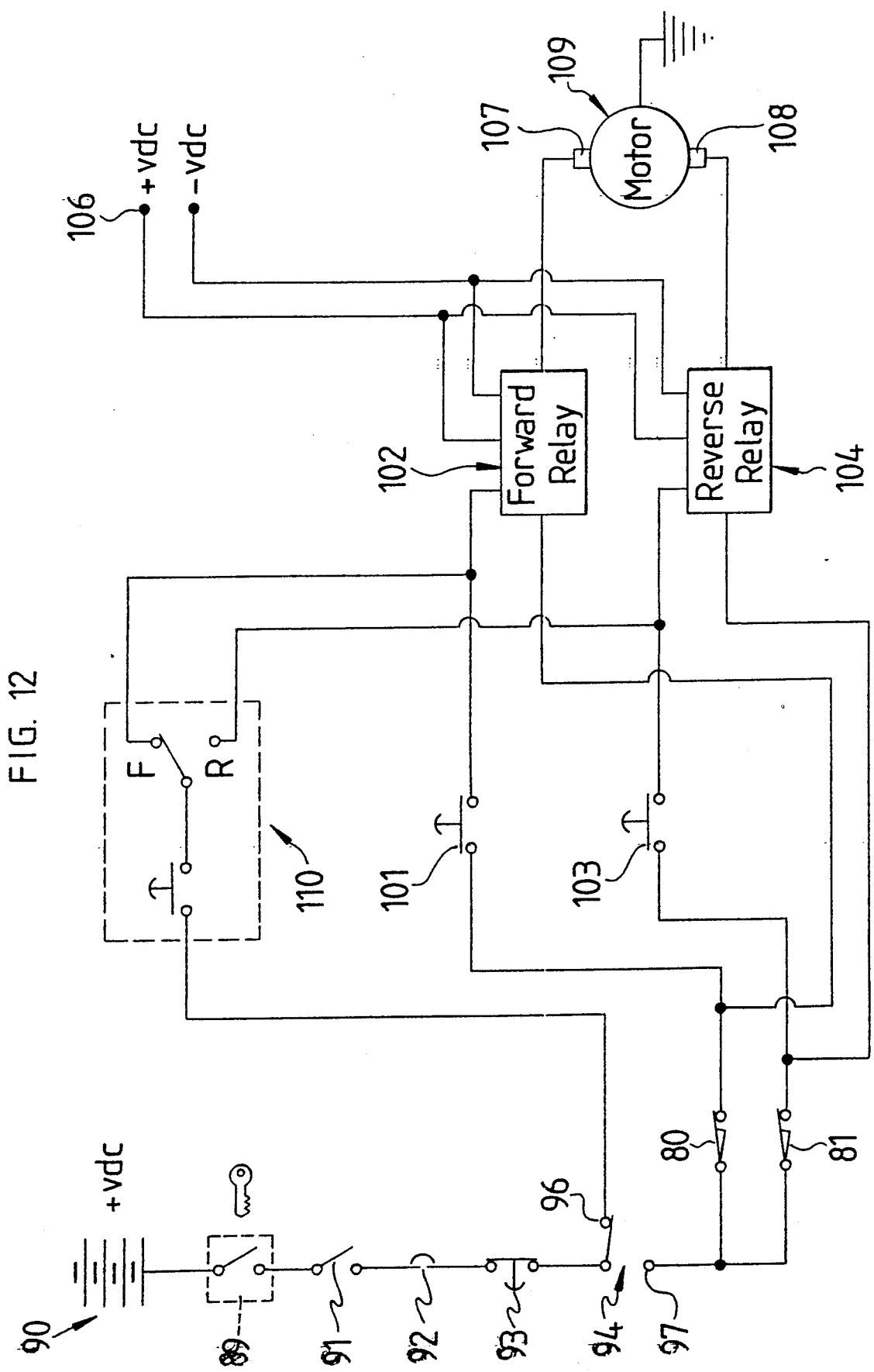
FIG. 12 is a schematic of the control circuit.

The winch assembly 32 is powered by a battery 90 which is connected to the winch assembly 32 by a control circuit which is shown in detail in FIG. 12.

Figure 4:
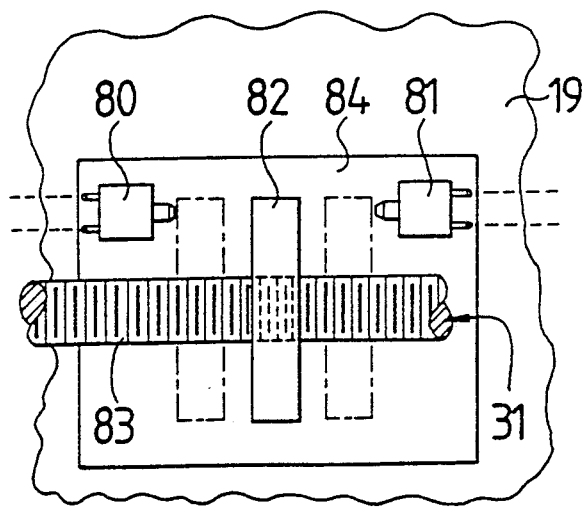
FIG. 4 is a detailed elevational view of the threaded portion of the winch shaft, a limit nut threaded thereon and two limit switches.
Figure 5:
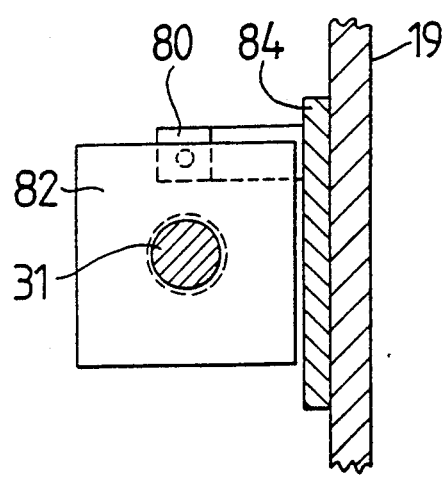
FIG. 5 is a sectional view along line 5—5 of FIG. 4.

The extent of forward and reverse movement of the scraping carriage is automatically restricted by a forward limit switch 80 and a reverse limit switch 81, physically located on the front of the dump body as shown in FIG. 2 and integrated in the control circuit as shown in FIG. 12. These limit switches 80 and 81 remain closed unless engaged by a square limit nut 82 which is axially connected to a threaded portion 83 of the drive shaft 31 as shown in FIGS. 4 and 5. The limit nut 82 is secured in a non-rotating position by a slip plate 84 which is mounted on the front wall of the dump body 19, wherein the slip plate 84 is closely contacted by a marginal edge of said square limit nut 82. As the drive shaft 31 is rotated by the winch assembly 32, the threaded portion 83 drives the limit nut 82 toward either limit switch 80 or 81 depending on the direction of rotation of the drive shaft 31. The forward limit switch 80 is located proximate the limit nut 82, being positioned in the path the limit nut 82 will move when the drive shaft 31 is rotating the winding drums 35 and 36 in a forward direction, such forward direction defined as that direction necessary to urge the scraping carriage 20 toward the front of the dump body 19. The reverse limit switch 81 is located proximate the limit nut 82, being positioned in the path the limit nut 82 will move when the drive shaft 31 is rotating the winding drums 35 and 36 in a reverse direction, such reverse direction defined as that direction necessary to urge the scraping carriage 20 toward the rear of the dump body 19. The limit switches 80 and 81 are slidably adjustable on the slip plate 84 thereby varying the distance the limit nut 82 must travel before contacting the limit switches, consequently regulating the distance the sliding carriage 20 may travel on the dump bed 21 before activating a limit switch.

The aforementioned control circuit shown in detailed form in FIG. 12 includes an ignition switch 89 being the same ignition switch utilized to start the dump truck's engine (not shown) and being connected to a positive pole of the battery 90. The ignition switch 89 is used to selectively open or close the control circuit and since the switch 89 will require a key to operate, will aid in preventing unauthorized use of the present invention. The ignition switch 89 is connected to a main disconnect switch 91 which is used to open or close the control circuit. A 12 volt, 150 amp circuit breaker 92 is connected to the main disconnect switch 91 which will operate to disconnect the control circuit should the ampere load on the circuit exceed 150 amps. An emergency shut-off button 93 is connected to the circuit breaker 92 and when manually operated will rapidly disconnect the control circuit. A method switch 94 is connected to the emergency shut-off button 93 and is used to select either a manual terminal 96 or an automatic terminal 97 for connection with the circuit. The forward limit switch 80 and the reverse limit switch 81 are independently connected to the automatic terminal 97. A forward relay switch 101 is connected to the forward limit switch 80 and a forward relay 102 is operatively connected to the forward relay switch 101. The forward relay 102 is also connected to the forward limit switch 80 from the forward relay switch 101. A reverse relay switch 103 is connected to the reverse limit switch 81 and a reverse relay 104 is connected to the reverse relay switch 103. The reverse relay 104 is also connected to the reverse limit switch 80 upstream from the reverse relay switch 104. The relay switches 101 and 103 are spring biased toward an open position and are closed only when manually activated. When one or the other relay switches 101 or 103 is activated, current flows to and activates either the forward relay 102 or the reverse relay 104 dependent on which switch is activated. Both the forward and reverse relays 102 and 104 are operatively connected to a negative pole of the battery 90, thereby completing the control circuit. As shown in FIG. 12, each relay 102 and 104 is operatively connected to the positive pole 106 of the power supply and are respectively connected to a forward drive element 107 and a reverse drive element 108 of the motor 109 which is used to rotate the winch assembly 32. A remote manual switch 110 is connected to the manual terminal 96 and selectively connects the manual terminal 96 to the forward relay 102 or the reverse relay 104. The forward relay 102, once activated, closes a circuit connected to the power supply and the forward drive element 107. The reverse relay 104, once activated, closes a circuit connected to the power supply and the reverse drive element 108.

When the forward drive element 107 is activated by current the winch assembly 32 rotates the drive shaft 31 and the winding drums 35 and 36 in the forward direction consequently moving the sliding carriage 20 toward the front of the dump body 19. The forward motion of the sliding carriage 20 dislodges adhering materials which may cling to the dump bed 21. When the reverse drive element 108 is activated by current the winch assembly 32 rotates the drive shaft 31 and the winding drums 35 and 36 in the reverse direction consequently moving the sliding carriage 20 toward the rear of the dump body 19. The reverse motion of the sliding carriage 31 further dislodges adhering materials which may cling to the dump bed 21 and removes them from the rear of the dump body 19. This apparatus can be and generally is operated while the dump body is in an inclined position. The preferred embodiment of the present invention also includes a bar and chain assembly 111 located on the inside surface of the forward wall 112 of the dump body 19. The bar and chain assembly 111 includes two bar members 113 suspended from the forward wall 112 by a plurality of chains 114. When the dump body 19 is tilted, the bar and chain assembly is gravitationally pulled away from the forward wall 112, thereby dislodging residual load material adhering to such forward wall 112.

When the dump body 19 is empty, the carriage 20 should be urged to the forward end of the dump body 19. Securing plates 120 located at the forward end of the dump body 19 and extending perpendicular from the forward wall 112 of the dump body 19 will secure the carriage 20 in a non-vibrating position at the front of the dump body 19. When load materials are placed in the dump body 19, the carriage 20 should be positioned in the dump body 19 as far forward as possible. When the dump body 19 is tilted, thereby discharging the load material, the carriage 20 being located at the front of the dump body 19 is out of the flow of load material moving down the tilted dump bed 21. After a predominant portion of the load material is discharged by the tilting of the dump body 19, the carriage 20 is urged toward the rear of the dump body 19 thereby dislodging any adhering load material from the dump bed 21 and sweeping such material out the rear of the dump body 19.

While I have shown my invention in one form, it will be obvious to those skilled in the art that it is not so limited but is susceptible of various changes and modifications without departing from the spirit thereof.

I claim:

1. Apparatus used with dump trucks for disengaging and removing residual load material adhering to a dump bed of said dump truck, said dump bed being a planar surface forming the bottom of said dump truck's dump body, said dump body pivotally connected to said dump truck for movement about a horizontal axis, and defined by said dump bed, a forward wall, two side walls and a tailgate, wherein said apparatus comprises:
    (a) means located within said dump body and positioned across said dump bed for scraping residual material from said dump bed; and
    (b) means operatively connected to said scraping means for selectively urging said scraping means along said dump bed within said dump body; wherein said urging means includes a rotatable drive shaft mounted horizontally across the front of said forward wall and wherein said drive shaft is selectively rotated by a motor operatively connected to said drive shaft by a chain and sprocket assembly, said motor and chain and sprocket assembly being connected to said forward wall for pivotal movement therewith about said horizontal axis.

2. Apparatus as described in claim 1 wherein said scraping means comprises a plurality of scrapers located in parallel lateral extension across said dump bed.

3. Apparatus as described in claim 2 wherein said scrapers are defined by a cross-sectionally curved beam member laterally extending said dump bed with the anti-cline of said beam member being upwardly oriented thereby positioning the marginal edges of said beam member adjacent said dump bed.

4. Apparatus as described in claim 3 wherein said scraping means further comprises a plurality of gussets connected between and extending perpendicular to said scrapers.

5. Apparatus as described in claim 2 wherein said scrapers are held in parallel lateral extension across said dump bed by two end beams perpendicularly connected to the lateral extremities of said scrapers.

6. Apparatus as described in claim 1 wherein said drive shaft can be selectively rotated by a manual crank removably connected to said motor.

7. Apparatus as described in claim 6 comprising a means for selectively controlling the operation of said urging means.

8. Apparatus as described in claim 7 wherein said controlling means comprises a limit nut axially connected to a threaded portion of said drive shaft, said limit nut being secured in a non-rotating position by a slip plate extending alongside and in proximal contact with said limit nut, wherein said limit nut moves longitudinally in relation to said slip plate being propelled by the rotation of said drive shaft.

9. Apparatus as described in claim 8 comprising a forward limit switch and a reverse limit switch located proximate said limit nut being adjustably slidable in relation to said limit nut wherein said limit nut will contact said forward limit switch when said drive shaft has made a sufficient number of rotations to move said scraping means within a first predetermined distance of said front wall of said dump body, wherein said limit nut will contact said reverse limit switch when said drive shaft has made a sufficient number of rotations to move said scraping means within a second predetermined distance of said tailgate of said dump body.

10. Apparatus as described in claim 9 wherein said controlling means further comprises an electric circuit electrically connected to said limit switches and said means for urging for selectively actuating said means for urging to move said scraper means in a forward or rearward direction.

11. Apparatus as described in claim 1 wherein said urging means further comprises two winding drums axially secured to said drive shaft and rotating concomitantly therewith.

12. Apparatus as described in claim 1 wherein said drive shaft is rotatably mounted to said dump body by three pillow blocks, wherein said drive shaft extends through and is secured within said pillow blocks by bearings.

13. Apparatus as described in claim 12 wherein said drive shaft is rotated by an electric winch assembly connected to said dump body being operatively connected to said drive shaft by a chain and sprocket assembly.

14. Apparatus as described in claim 7 comprising a pair of bar members suspended on said forward wall by a plurality of chains, wherein said bar members and said chains swing away from said forward wall when said dump body is tilted.

15. Apparatus as described in claim 1 wherein said urging means comprises:
   (a) a pair of winding drums axially secured to said drive shaft for concomitant rotation therewith; and
   (b) two pair of urging cables, each pair of urging cables being further comprises of a forward cable and a reverse cable wherein each pair of said urging cables is connected to one of said rotatable drums and scraping means.

16. Apparatus as described in claim 15 wherein said urging means is comprised of a pair of upper double pulleys located on the upper portion of said dump body's forward wall, a pair of lower double pulleys located on the interior surfaces of the lower forward portion of said sidewalls and a pair of rearward single pulleys located on the interior surfaces of the lower rearward portion of said sidewalls wherein said forward cables extend a plurality of rotations around said drums, upward cables extend a plurality of rotations around said drums, upward and over said upper double pulleys, downward and under said lower double pulleys and around said rearward single pulleys to said scraping means being affixed thereto; wherein said reverse cables extend a plurality of rotations around said drum counter the direction said forward cables extend around said drums, upward and over said upper double pulleys, downward and under said lower double pulleys and thereby extend from said lower double pulley to said scraping means being affixed thereto.

17. Apparatus as described in claim 16 wherein said cables and pulleys located within said dump body are enclosed within a pair of cable housings which are each partially defined by a cross-sectionally L-shaped cable cover connected to said sidewalls, located parallel to and co-extending with said cables, wherein said cable covers define a scraping slot extending adjacent to said dump bed through which said scraping means extends and can be longitudinally urged.

18. Apparatus as described in claim 17 wherein each said cable housing comprises a flexible protective belt co-extending said cable cover in downward extension across said scraping slot.

19. Apparatus as described in claim 1 comprising a plurality of securing plates connected to and extending perpendicularly from said forward wall for securing said scraping means in a non-vibrating position intermediate said securing plates and said dump bed when said scraping means is urged beneath said securing plates.

20. Apparatus used with dump trucks for engaging and removing residual load material adhering to a dump bed of said dump truck, said dump bed being a planar surface forming the bottom of said dump truck's dump body, said dump body being defined by said dump bed, a forward wall, two side walls and a tailgate, wherein said apparatus comprises:
   (a) means located within a dump body and positioned across said dump bed for scraping residual material therefrom; and
   (b) means operatively connected to said scraping means for selectively urging said scraping means along said dump bed within said dump body; wherein said urging means include a rotatable drive shaft mounted horizontally across the front of said forward wall and two winding drums axially secured to said drive shaft and rotating concomitantly therewith, wherein each said winding drum is mounted to said drive shaft by a pair of adjusting plates, each plate being annularly secured to and radially extending from said drive shaft, wherein each end of said drums is adjustably secured to said adjusting plates by a pair of securing bolts which extend through a pair of rotation slots defined within each adjusting plate.

21. Apparatus used with dump trucks for disengaging and removing residual load material adhering to a dump bed of said dump truck, said dump bed being a planar surface forming the bottom of said dump truck's dump body, said dump body being defined by said dump bed, a forward wall, two side walls and a tailgate, wherein said apparatus comprises:
   (a) means located within a dump body and positioned across said dump bed for scraping residual material therefrom; and
   (b) means operatively connected to said scraping means for selectively urging said scraping means along said dump bed within said dump body, wherein said urging means includes a rotatable drive shaft mounted horizontally across the front of said forward wall, wherein said drive shaft is rotatably mounted to said dump body by three pillow blocks and said drive shaft extends through and is secured within said pillow blocks by bearings, said drive shaft being rotated by an electric winch assembly connected to said dump body and said winch being operatively connected to said drive shaft by a chain and sprocket assembly, wherein said pillow blocks and said electric winch assembly are slidably connected to said dump body by a plurality of adjusting slots defined within said pillow blocks and said electric winch assembly.

22. Apparatus as described in claim 21 wherein said scraping means comprises a plurality of scrapers located in parallel lateral extension across said dump bed.

23. Apparatus as described in claim 22 wherein two end beams are perpendicularly attached to the lateral extremities of said scrapers, thereby positioning said scrapers parallel to each other.

24. Apparatus as described in claim 23 further comprising two pair of urging cables, each pair of urging cables being further comprised of a forward cable and a reverse cable, wherein each pair of said urging cables is connected to said drive shaft and said scraping means.

25. Apparatus as described in claim 24 wherein said urging means is comprised of a pair of upper double pulleys located on the upper portion of said dump body's forward wall, a pair of lower double pulleys located on the interior surfaces of the lower forward portion of said sidewalls and a pair of rearward single pulleys located on the interior surfaces of the lower rearward portion of said sidewalls wherein said forward cables extend a plurality of rotations around said drums, upward and over said upper double pulleys, downward and under said lower double pulleys and around said rearward single pulleys, thereby extending from said rearward single pulleys to said end beam of said scraping means being affixed thereto; wherein said reverse cables extend a plurality of rotations around said drum, counter the direction said forward cables extend around said drums, upward and over said upper double pulleys, downward and under said lower double pulleys and thereby extend from said lower double pulley to said end beam of said scraping means being affixed thereto.

26. Apparatus as described in claim 25 wherein said cables and pulleys located within said dump body are enclosed within a pair of cable housings which are each partially defined by a cross-sectionally L-shaped cable cover connected to said sidewalls, located parallel to and co-extending with said cables, wherein said cable covers define a scraping slot extending adjacent to said dump bed through which said scraping means extends and can be longitudinally urged.

27. Apparatus as described in claim 26 wherein each said cable housing is further defined by a flexible protective belt co-extending said cable cover in downward extension across said scraping slot.

28. Apparatus as described in claim 25 wherein said forward cables are connected to a forward portion of said end beams and said reverse cables are connected to a rearward portion of said end beams.

29. Apparatus used with dump trucks for disengaging and removing residual load material adhering to a dump bed of said dump truck, said dump bed being a planar surface forming the bottom of said dump truck's dump body, said dump body being defined by said dump bed, a forward wall, two side walls and a tailgate, wherein said apparatus comprises:

(a) means located within a dump body and positioned across said dump bed for scraping residual material therefrom;

(b) means operatively connected to said scraping means for selectively urging said scraping means along said dump bed within said dump body, wherein said urging means comprises a rotatable drive shaft mounted horizontally across the front of said dump body and said drive shaft is selectively rotated by a motor operatively connected to said drive shaft by chain and sprocket assembly, wherein said drive shaft can be selectively rotated by a manual crank removably connected to said motor;

(c) means for selectively controlling the operation of said urging means having a limit nut axially connected to a threaded portion of said drive shaft, said limit nut being secured in a non-rotating position by a slip plate extending alongside and in proximal contact with said limit nut, wherein said limit nut moves longitudinally in relation to said slip plate being propelled by the rotation of said drive shaft and a forward limit switch and a reverse limit switch located proximate said limit nut being adjustably slidable in relation to said limit nut, wherein said limit nut will contact said reverse limit switch when said drive shaft has made a sufficient number of rotations to move said scraping means within a first predetermined distance of said front wall of said dump body, wherein said limit nut will contact said reverse limit switch when said drive shaft has made a sufficient number of rotations to move said scraping means within a second predetermined distance of said tailgate of said dump body; and (d) a plurality of securing plates connected to and extending perpendicularly from said forward wall, said securing plates securing said scraping means in a non-vibrating position intermediate said securing plates and said dump bed when said scraping means is urged beneath said securing plates.

* * * * *